United States Patent [19]

Hong

[11] Patent Number: 5,770,534
[45] Date of Patent: Jun. 23, 1998

[54] CERAMIC COMPOSITION FOR ABSORBING ELECTROMAGNETIC WAVES AND METHOD FOR MANUFACTURING THE SAME

[76] Inventor: Sung-Yong Hong, 210-702, Hanbomido Apartment, 511 Daechi-Dong, Kangnam-Ku, Seoul, Rep. of Korea

[21] Appl. No.: 881,764

[22] Filed: Jun. 24, 1997

[30] Foreign Application Priority Data

Feb. 12, 1997 [KR] Rep. of Korea ................. 97-4095

[51] Int. Cl.$^6$ .................... C04B 35/26; B28B 1/00; H05K 9/00
[52] U.S. Cl. .................... 501/1; 501/126; 376/287; 376/397; 174/35 MS; 264/611; 264/614; 264/620
[58] Field of Search ................. 501/1, 126; 174/35 MS; 376/287, 397; 264/611, 614, 620

[56] References Cited

U.S. PATENT DOCUMENTS

| | | | |
|---|---|---|---|
| 3,742,176 | 6/1973 | Ishino et al. | 219/10.55 |
| 4,629,843 | 12/1986 | Kato et al. | 219/10.49 R |
| 4,960,642 | 10/1990 | Kosuga et al. | 428/407 |
| 5,668,070 | 9/1997 | Hong et al. | 501/126 |

*Primary Examiner*—David Brunsman
*Attorney, Agent, or Firm*—Ostrolenk, Faber, Gerb & Soffen, LLP

[57] ABSTRACT

A ceramic composition for absorbing electromagnetic waves and a method for manufacturing the same are disclosed. The composition comprises a raw powder comprising by weight between about 60% and about 80% $Fe_2O_3$, between about 3% and about 8% NiO, between about 15% and about 25% ZnO, and between about 3% and about 8% CuO, and a mixture around the raw powder comprising by weight between about 30% and about 50% water, between about 0.2% and about 0.6% a dispersing agent, between about 0.5% and about 1.0% a plasticizer, and between about 0.1% and about 0.4% a lubricant. The method comprises the steps of grinding the powder, converting the grounded powder into granulates, forming the granulates into a shaped body, sintering the shaped body in a furnace, and cooling the sintered body gradually. The ceramic composition can absorb much of the electromagnetic waves generated from electric devices such as cellular phones, beepers, computers, wireless telephones, etc. by attaching the ceramic composition at a predetermined position on the electric devices.

10 Claims, No Drawings

CERAMIC COMPOSITION FOR ABSORBING ELECTROMAGNETIC WAVES AND METHOD FOR MANUFACTURING THE SAME

BACKGROUND OF THE INVENTION

The present invention relates to a ceramic composition and a method for manufacturing the same, and more particularly to a ceramic composition for absorbing electromagnetic waves generated from electric devices such as a cellular phone, a beeper, a computer, a wireless telephone etc., and a method for manufacturing the same.

DESCRIPTION OF THE PRIOR ART

Generally, fine ceramics or new ceramics are different from conventional ceramics in their composition and their manufacturing method such as forming and sintering. That is, fine ceramics are manufactured by a forming method and a sintering method which exactly control a precisely prepared composition by using an artificial raw powder or a highly purified raw powder. Thus, fine ceramics have a greater number of applications than conventional ceramics. Fine ceramics are used for various purposes because various applications of fine ceramics have recently been discovered.

Fine ceramics are generally classified into oxide type ceramics and non-oxide type ceramics. An oxide type ceramic includes alumina ($Al_2O_3$), ferrite ($Fe_2O_3$), zirconia ($ZrO_2$), and titania ($TiO_2$) etc. A non-oxide type ceramic includes silicon carbide (SiC), and silicon nitride ($Si_3N_4$) and so on. Now, new applications for fine ceramics such as thermal applications, mechanical applications, bio-chemical applications, electric applications, electronic applications, and optic applications are being discovered, and the research concerning these applications will be continued.

At present, many electric devices such as cellular phones, beepers, computers, wireless telephones, televisions etc., are utilized during daily life. It is necessary to use these electric devices in modern daily life, but most of these devices radiate electromagnetic waves. It is well known to everybody that the electromagnetic waves generated from these electric devices are harmful to people who use these electric devices. Therefore, research for shielding the harmful electromagnetic waves generated from these electric devices is being continued. Pellets for making electromagnetic waves shielding material are disclosed in U.S. Pat. No. 4,960,642 (issued to Izumi Kosuga et. al). The pellets can shield electromagnetic waves by inserting conductive fibers into a matrix resin. Also, a method for absorbing electromagnetic waves generated from electric devices by means of installing a ferrite core into these electric devices is disclosed.

However, above-described pellets and method can't block enough of the electromagnetic waves generated from these electric devices, and the manufacturing method and the structure of these devices are complicated because the pellets and the magnetic core are inserted on the circuit board of the electromagnetic devices.

SUMMARY OF THE INVENTION

Considering the above-mentioned problems, it is a first object of the present invention to provide a ceramic composition for absorbing electromagnetic waves generated from electric devices by attaching the composition at a predetermined position on the electric devices.

It is a second object of the present invention to provide a method for manufacturing a ceramic composition for absorbing electromagnetic waves which is specially suited for manufacturing the ceramic composition.

To achieve the first object, the ceramic composition for absorbing electromagnetic waves according to the present invention comprises: a raw powder comprising by weight between about 60% and about 80% $Fe_2O_3$, between about 3% and about 8% NiO, between about 15% and about 25% ZnO, and between about 3% and about 8% CuO; and a mixture around the raw powder comprising by weight between about 30% and about 50% water, between about 0.2% and about 0.6% a dispersing agent, between about 0.5% and about 1.0% a plasticizer, and between about 0.1% and about 0.4% a lubricant.

Also, to achieve the second object, the method for manufacturing the ceramic composition for absorbing electromagnetic waves according to the present invention comprises the steps of: i) homogeneously mixing a raw powder comprising by weight between about 60% and about 80% $Fe_2O_3$, between about 3% and about 8% NiO, between about 15% and about 25% ZnO, and between about 3% and about 8% CuO, and a mixture around the raw powder comprising by weight between about 30% and about 50% water, between about 0.2% and about 0.6% a dispersing agent, between about 0.5% and about 1.0% a polyvinyl alcohol, between about 0.0005 and about 0.004 $Bi_2O_3$, and between about 0.1% and about 0.4% a lubricant; ii) grinding the mixed powder; iii) converting the grounded powder into granulates; iv) forming the granulates into a shaped body; v) sintering the shaped body to form a sintered body; and vi) cooling the sintered body gradually.

DETAILED DESCRIPTION OF THE INVENTION

Preferably, the mixture around the raw powder has by weight between about 0.0005 and about 0.004% $Bi_2O_3$ as the plasticizer and hexamethanol as the dispersing agent.

The step ii) is a wet grinding method using a ball mill for 2 hours to 4 hours so as to make the mixed powder having a particle distribution of between about 1 μm and about 3 μm. The step iii) is a spray drying method maintaining a temperature of an entrance of a spray-drier between 550° C. and 600° C. and maintaining a temperature of an exit of the spray-drier between 100° C. and 150° C. so as to make the granulates which have by weight between about 0.1% and about 0.4% moisture. Also, the step iv) is forming the granulates by using a metal pressing means at a pressure of between 800 $kg/cm^2$ and 1200 $kg/cm^2$.

Preferably, the step v) has the steps of: i) heating the shaped body loaded in a furnace up to a first temperature of about 400° C. for about 3 hours after loading the shaped body in the furnace, ii) maintaining the first temperature of the furnace at about 400° C. for about 1 hour, iii) heating the shaped body loaded in the furnace up to a second temperature of about 900° C. for about 4 hours, iv) maintaining the second temperature of the furnace at about 900° C. for about 2 hours, v) heating the shaped body loaded in the furnace up to a third temperature of about 1200° C. for about 3 hours, and vi) maintaining the third temperature of the furnace at about 1200° C. for about 2 hours.

Also, preferably, the step vi) further has the steps of: i) making the furnace airtight and cooling gradually the sintered body loaded in the furnace between about 40 hours and about 60 hours, and ii) unloading the sintered body from the furnace at a temperature below about 200° C. and cooling gradually the sintered body in an atmosphere.

In the case that the raw powder comprises by weight between about 65% and about 75% $Fe_2O_3$, between about 15% and about 25% ZnO, between about 4% and about 8% NiO, and between about 4% and about 8% CuO, absorption rates of electric fields generated from electric devices are between about 59.7% and about 61.9%. Particularly, in the case that the raw powder comprises by weight about 70% $Fe_2O_3$, about 20% ZnO, about 5% NiO, and about 5% CuO, an absorption rate of an electric field has a maximum value of about 61.9% when the absorption rate is measured by using a Holaday HI-4000 RF Hazard Measurement System. However, when a raw powder comprises by weight below about 40% $Fe_2O_3$ and below about 15% ZnO, a forming density of the raw powder is lowered and a dense sintered body cannot be obtained. As a result, an absorption rate of an electric field is below about 30%. Also, when a raw powder comprises by weight above about 80% $Fe_2O_3$ or by weight above about 30% ZnO, an absorption rate of an electric field is below about 30% because grinding the raw powder and adjusting the grain size of the raw powder may be difficult, so the grain size of the raw powder grows excessively during sintering of the raw powder.

Therefore, the ceramic composition according to the present invention can absorb the electromagnetic waves generated from electric devices such as cellular phones, beepers, computers, wireless telephones, televisions, etc. by attaching the composition at predetermined position on the devices.

The above objects and other advantages of the present invention will become more apparent by describing in detail the preferred embodiments thereof.

EXAMPLE 1

A raw powder comprising by weight about 70% $Fe_2O_3$, about 5% NiO, about 20% ZnO, and about 5% CuO, and a mixture around the raw powder comprising by weight about 40% water, about 0.4% hexamethanol as a dispersing agent, about 0.75% polyvinyl alcohol and about 0.001% $Bi_2O_3$ as a plasticizer, and about 0.2% $H_2ZnO_2$ as a lubricant, were homogeneously mixed.

The $Fe_2O_3$, the NiO, the ZnO, and the CuO were powders manufactured by Kyocera Co., Japan. The dispersing agent, the plasticizer and the lubricant were produced by Sannop Co., Japan.

Subsequently, the mixed powder was grounded by using a wet grinding method in a ball mill for about 2 hours to about 4 hours, preferably for 3 hours, and then the grounded powder was converted to granulates which had a particle distribution of between about 1 $\mu$m and about 3 $\mu$m, and the granulates were formed by using a spray-drier. At that time, a temperature of an entrance of the spray-drier was maintained between about 550° C. and about 600° C., preferably 580° C., and a temperature of an exit of the spray-drier was maintained between about 100° C. and about 150° C., preferably 120° C., so granulates having a moisture content of between about 0.2% and about 0.3% were made. The granulates had a density of 1.05 g/cm$^3$ to 1.13 g/cm$^3$.

The granulates were pressed by using a metal press at the pressure of between about 800 kg/cm$^2$ and about 1200 kg/cm$^2$, preferably 1000 kg/cm$^2$, at room temperature, to form a shaped body having a density of between about 1.15 g/cm$^3$ and about 1.23 g/cm$^3$.

Successively, the shaped body was sintered in a furnace for 15 hours. The sintering process of the shaped body was divided into 6 steps as follows.

A first step was heating the shaped body in the furnace to a temperature of about 400° C. for 3 hours after loading the shaped body in the furnace. A second step was fixing a temperature of the furnace at 400° C. for 1 hour. A third step was heating the shaped body in the furnace from 400° C. to 900° C. for 4 hours. A fourth step was fixing a temperature of the furnace at 900° C. for 2 hours. A fifth step was heating the shaped body in the furnace from 900° C. to 1200° C. for 3 hours. A sixth step was fixing a temperature of the furnace at 1200° C. for 2 hours. As a result, a sintered body was obtained.

Then, the sintered body in the furnace was cooled gradually for 50 hours after the furnace was made airtight. When a temperature of the furnace was below 200° C., the sintered body was cooled in an atmosphere so as to produce a ceramic composition having a predetermined shape after the sintered body was unloaded from the furnace.

An absorption rate of an electric field generated by a cellular phone (manufactured by LG Electronics Co., Korea) according to the present embodiment is shown in Table 1. The generated electric field and the absorption rate shown in Table 1 were measured at an interval of 5 cm from the cellular phone by using a Holaday HI-4000 RF Measurement System.

TABLE 1

|  | Not attaching the ceramic composition | Attaching the ceramic composition | Absorption Rate (%) |
| --- | --- | --- | --- |
| Electric Field (V/m) | 28.3 | 10.8 | 61.8 |

Referring to Table 1, after the ceramic composition according to the present example is attached to the cellular phone, the electric field is 10.8 V/m. When the ceramic composition is not attached to the cellular phone, the electric field is 28.3 V/m. Therefore, the absorption rate of the electric field by the ceramic composition is about 61.8%.

Table 2 shows the absorption rate of the electric field generated from a cellular phone produced by Motorola Electronics Co. The electric field and the absorption rate shown in Table 2 are measured at an interval of 2 cm from the cellular phone by using the Holaday HI-4000 RF Measurement System.

TABLE 2

|  | Not attaching the ceramic composition | Attaching the ceramic composition | Absorption Rate (%) |
| --- | --- | --- | --- |
| Electric Field (V/m) | 31.3 | 11.9 | 61.9 |

Referring to Table 2, after the ceramic composition according to the present example is attached to the cellular phone, the electric field is 11.9 V/m. When the ceramic composition is not attached to the cellular phone, the electric field is 31.3 V/m. Therefore, the absorption rate of electric field by the ceramic composition is about 61.9%.

Therefore, as shown in Table 1 and Table 2, the ceramic composition according to example 1 can absorb much of the electric field which is generated by electric devices.

EXAMPLE 2

A raw powder comprising by weight about 65% $Fe_2O_3$, about 4% NiO, about 25% ZnO, and about 6% CuO, and a mixture around the raw powder comprising by weight about 40% water, about 0.3% hexamethanol as a dispersing agent, about 0.6% polyvinyl alcohol and about 0.002% $Bi_2O_3$ as a plasticizer, and about 0.25% $H_2ZnO_2$ as a lubricant, were homogeneously mixed. In this example, the materials were the same as those in the example 1.

Subsequently, the mixed powder was grounded by using a wet grinding method in a ball mill for about 2 hours to about 4 hours, preferably for 3 hours, and then the grounded powder was converted to granulates which had a particle distribution of between about 1 μm and about 3 μm. The granulates were formed by using a spray-drier. At that time, a temperature of an entrance of the spray-drier was maintained between about 550° C. and about 600° C., preferably 580° C., and a temperature of an exit of the spray-drier was maintained between about 100° C. and about 150° C., preferably 120° C., so granulates having a moisture content of between about 0.2% and about 0.3% were made. The granulates had a density of 1.05 $g/cm^3$ to 1.13 $g/cm^3$.

The granulates were pressed by using a metal press at the pressure of between about 800 $kg/cm^2$ and about 1200 $kg/cm^2$, preferably 1000 $kg/cm^2$, at room temperature, to form a shaped body having a density of between about 1.15 $g/cm^3$ and about 1.23 $g/cm^3$.

Successively, the shaped body was sintered in a furnace for 15 hours. The sintering process of the shaped body was divided into 6 steps as follows.

A first step was heating the shaped body in the furnace to a temperature of about 400° C. for 3 hours after loading the shaped body in the furnace. A second step was fixing a temperature of the furnace at 400° C. for 1 hour. A third step was heating the shaped body in the furnace from 400° C. to 900° C. for 4 hours. A fourth step was fixing a temperature of the furnace at 900° C. for 2 hours. A fifth step was heating the shaped body in the furnace from 900° C. to 1200° C. for 3 hours. A sixth step was fixing a temperature of the furnace at 1200° C. for 2 hours. As a result, a sintered body was obtained.

Then, the sintered body in the furnace was cooled gradually for 50 hours after the furnace was made airtight. When a temperature of the furnace was below 200° C., the sintered body was cooled in an atmosphere so as to produce a ceramic composition having a predetermined shape after the sintered body was unloaded from the furnace.

An absorption rate of an electric field generated by a cellular phone (manufactured by LG Electronics Co., Korea) according to the present example is shown in Table 3. The generated electric field and the absorption rate shown in Table 3 were measured at an interval of 5 cm from the cellular phone by using the Holaday HI-4000 RF Measurement System.

TABLE 3

|  | Not attaching the ceramic composition | Attaching the ceramic composition | Absorption Rate (%) |
|---|---|---|---|
| Electric Field (V/m) | 27.9 | 11.1 | 60.2 |

Referring to Table 3, after the ceramic composition according to the present example is attached to the cellular phone, the electric field is 11.1 V/m. When the ceramic composition is not attached to the cellular phone, the electric field is 27.9 V/m. Therefore, the absorption rate of electric field by the ceramic composition is about 60.2%.

Table 4 shows the absorption rate of an electric field generated from a cellular phone produced by Motorola Electronics Co. The electric field and the absorption rate shown in Table 4 are measured at an interval of 2 cm from the cellular phone by using the Holaday HI-4000 RF Measurement System.

TABLE 4

|  | Not attaching the ceramic composition | Attaching the ceramic composition | Absorption Rate (%) |
|---|---|---|---|
| Electric Field (V/m) | 31.5 | 12.3 | 61.0 |

Referring to Table 4, after the ceramic composition is attached to the cellular phone, the electric field is 12.3 V/m. When the ceramic composition is not attached to the cellular phone, the electric field is 31.5 V/m. Therefore, the absorption rate of the electric field by the ceramic composition is about 61.0%.

Therefore, as shown in Table 3 and Table 4, the ceramic composition according to example 2 can absorb much of the electric field which is generated by electric devices.

EXAMPLE 3

A raw powder comprising by weight about 69% $Fe_2O_3$, about 8% NiO, about 15% ZnO, and about 8% CuO, and a mixture around the raw powder comprising by weight about 40% water, about 0.5% hexamethanol as a dispersing agent, about 0.7% polyvinyl alcohol and about 0.003% $Bi_2O_3$ as a plasticizer, and about 0.3% $H_2ZnO_2$ as a lubricant, were homogeneously mixed.

In the present example, the materials were the same as those in the example 1. Also, the processes of grinding, pressing, sintering, and cooling were the same as those in the example 1.

An absorption rate of an electric field generated by a cellular phone (manufactured by LG Electronics Co., Korea) according to the present example is shown in Table 5. The generated electric field and the absorption rate shown in Table 5 were measured at an interval of 5 cm from the cellular phone by using the Holaday HI-4000 RF Measurement System.

TABLE 5

|  | Not attaching the ceramic composition | Attaching the ceramic composition | Absorption Rate (%) |
|---|---|---|---|
| Electric Field (V/m) | 28.6 | 11.0 | 61.5 |

Referring to Table 5, after the ceramic composition according to the present example is attached to the cellular phone, the electric field is 11.0 V/m. When the ceramic composition is not attached to the cellular phone, the electric field is 28.6 V/m. Therefore, the absorption rate of the electric field by the ceramic composition is about 61.5%.

Table 6 shows an absorption rate of an electric field generated from a cellular phone produced by Motorola Electronics Co. The electric field and the absorption rate shown in Table 6 are measured at an interval of 2 cm from the cellular phone by using the Holaday HI-4000 RF Measurement System.

TABLE 6

|  | Not attaching the ceramic composition | Attaching the ceramic composition | Absorption Rate (%) |
|---|---|---|---|
| Electric Field (V/m) | 31.1 | 11.9 | 61.7 |

Referring to Table 6, after the ceramic composition according to the present example is attached to the cellular phone, the electric field is 11.9 V/m. When the ceramic composition is not attached to the cellular phone, the electric field is 31.1 V/m. Hence, the absorption rate of the electric field by the ceramic composition is about 61.7%.

Therefore, as shown in Table 5 and Table 6, the ceramic composition according to example 3 can absorb much of the electric field which is generated by electric devices.

EXAMPLE 4

A raw powder comprising by weight about 75% $Fe_2O_3$, about 4% NiO, about 17% ZnO, and about 4% CuO, and a mixture around the raw powder comprising by weight about 40% water, about 0.4% hexamethanol as a dispersing agent, about 0.8% polyvinyl alcohol and about 0.002% $Bi_2O_3$ as a plasticizer, and about 0.25% $H_2ZnO_2$ as a lubricant, were homogeneously mixed.

In the present example, the materials were the same as those in the example 1. Also, the processes of grinding, pressing, sintering, and cooling were the same as those in the example 1.

An absorption rate of an electric field generated by a cellular phone (manufactured by LG Electronics Co., Korea) according to the present example is shown in Table 7. The generated electric field and the absorption rate shown in Table 7 were measured at an interval of 5 cm from the cellular phone by using the Holaday HI-4000 RF Measurement System.

TABLE 7

|  | Not attaching the ceramic composition | Attaching the ceramic composition | Absorption Rate (%) |
|---|---|---|---|
| Electric Field (V/m) | 28.1 | 11.2 | 60.1 |

Referring to Table 7, after the ceramic composition according to the present example is attached to the cellular phone, the electric field is 11.2 V/m. When the ceramic composition is not attached to the cellular phone, the electric field is 28.1 V/m. Therefore, the absorption rate of the electric field by the ceramic composition is about 60.1%.

Table 8 shows an absorption rate of an electric field generated from a cellular phone produced by Motorola Electronics Co. The electric field and the absorption rate shown in Table 8 are measured at an interval of 2 cm from the cellular phone by using the Holaday HI-4000 RF Measurement System.

TABLE 8

|  | Not attaching the ceramic composition | Attaching the ceramic composition | Absorption Rate (%) |
|---|---|---|---|
| Electric Field (V/m) | 31.3 | 12.6 | 59.7 |

Referring to Table 8, after the ceramic composition according to the present example is attached to the cellular phone, the electric field is 12.6 V/m. When the ceramic composition is not attached to the cellular phone, the electric field is 31.3 V/m. Hence, the absorption rate of the electric field by the ceramic composition is about 59.7%.

Therefore, as shown in Table 7 and Table 8, the ceramic composition according to example 4 can absorb much of the electric field which is generated by electric devices.

As it is described above, the ceramic composition according to the present invention can absorb much of the electric field generated by electric devices. That is, the ceramic composition can absorb the electromagnetic waves generated from electric devices.

While the present invention has been particularly shown and described with reference to particular embodiments thereof, it will be understood by those skilled in the art that various changes in form and detail may be effected therein without departing from the spirit and scope of the invention as defined by the appended claims.

What is claimed is:

1. A ceramic composition for absorbing electromagnetic waves, comprising:

a raw powder comprising by weight between about 60% and about 80% $Fe_2O_3$, between about 3% and about 8% NiO, between about 15% and about 25% ZnO, and between about 3% and about 8% CuO; and a mixture around the raw powder comprising by weight between about 30% and about 50% water, between about 0.2% and about 0.6% a dispersing agent, between about 0.5% and about 1.0% a plasticizer, and between about 0.1% and about 0.4% a lubricant.

2. The ceramic composition for absorbing electromagnetic waves as claimed in claim 1, wherein said plasticizer around the raw powder comprises by weight between about 0.5% and about 1.0% polyvinyl alcohol and between about 0.0005 and about 0.004% $Bi_2O_3$.

3. The ceramic composition for absorbing electromagnetic waves as claimed in claim 1, wherein said dispersing agent comprises hexamethanol and said lubricant comprises $H_2ZnO_2$.

4. A method for manufacturing a ceramic composition for absorbing electromagnetic waves, comprising the steps of:

i) homogeneously mixing a raw powder comprising by weight between about 60% and about 80% $Fe_2O_3$, between about 3% and about 8% NiO, between about 15% and about 25% ZnO, and between about 3% and about 8% CuO, and a mixture around the raw powder comprising by weight between about 30% and about 50% water, between about 0.2% and about 0.6% a dispersing agent, between about 0.5% and about 1.0% a polyvinyl alcohol, between about 0.0005 and about 0.004 $Bi_2O_3$, and between about 0.1% and about 0.4% a lubricant;

ii) grinding the mixed powder;

iii) converting the grounded powder into granulates;

iv) forming the granulates into a shaped body;

v) sintering the shaped body to form a sintered body; and vi) cooling the sintered body gradually.

5. The method for manufacturing a ceramic composition as claimed in claim 4, wherein said step ii) is a wet grinding method using a ball mill for 2 hours to 4 hours in order to form the mixed powder having a particle distribution of between about 1 μm and about 3 μm.

6. The method for manufacturing a ceramic composition as claimed in claim 4, wherein said step iii) is performed by a spray drying method and by using a spray-drier so as to form the granulates having a particle distribution of between about 1 µm and about 3 µm.

7. The method for manufacturing a ceramic composition as claimed in claim 6, wherein said step iii) is performed by maintaining a temperature of an entrance of the spray-drier between about 550° C. and about 600° C. and a temperature of an exit of the spray-drier between about 100° C. and about 150° C. so that the granulates have a moisture content of between about 0.2% and about 0.3%.

8. The method for manufacturing a ceramic composition as claimed in claim 4, wherein said step iv) is performed by using a metal press at a pressure of between about 800 kg/cm$^2$ and about 1200 kg/cm$^2$ at room temperature.

9. The method for manufacturing a ceramic composition as claimed in claim 4, wherein said step v) further comprises the steps of:

heating the shaped body in a furnace to a temperature of about 400° C. for 3 hours after loading the shaped body in the furnace;

fixing a temperature of the furnace at 400° C. for 1 hour;

heating the shaped body in the furnace from 400° C. to 900° C. for 4 hours;

fixing a temperature of the furnace at 900° C. for 2 hours;

heating the shaped body in the furnace from 900° C. to 1200° C. for 3 hours; and fixing a temperature of the furnace at 1200° C. for 2 hours.

10. The method for manufacturing a ceramic composition as claimed in claim 4, wherein said step iv) further comprises the steps of:

cooling gradually the sintered body in the furnace for 40 hours to 60 hours after the furnace is made airtight; and cooling the sintered body in an atmosphere after the sintered body is unloaded from the furnace when a temperature of the furnace is below about 200° C.

* * * * *